Dec. 10, 1929.   F. S. DAVIS ET AL   1,739,127
DUAL TIRE WHEEL
Filed Oct. 16, 1926
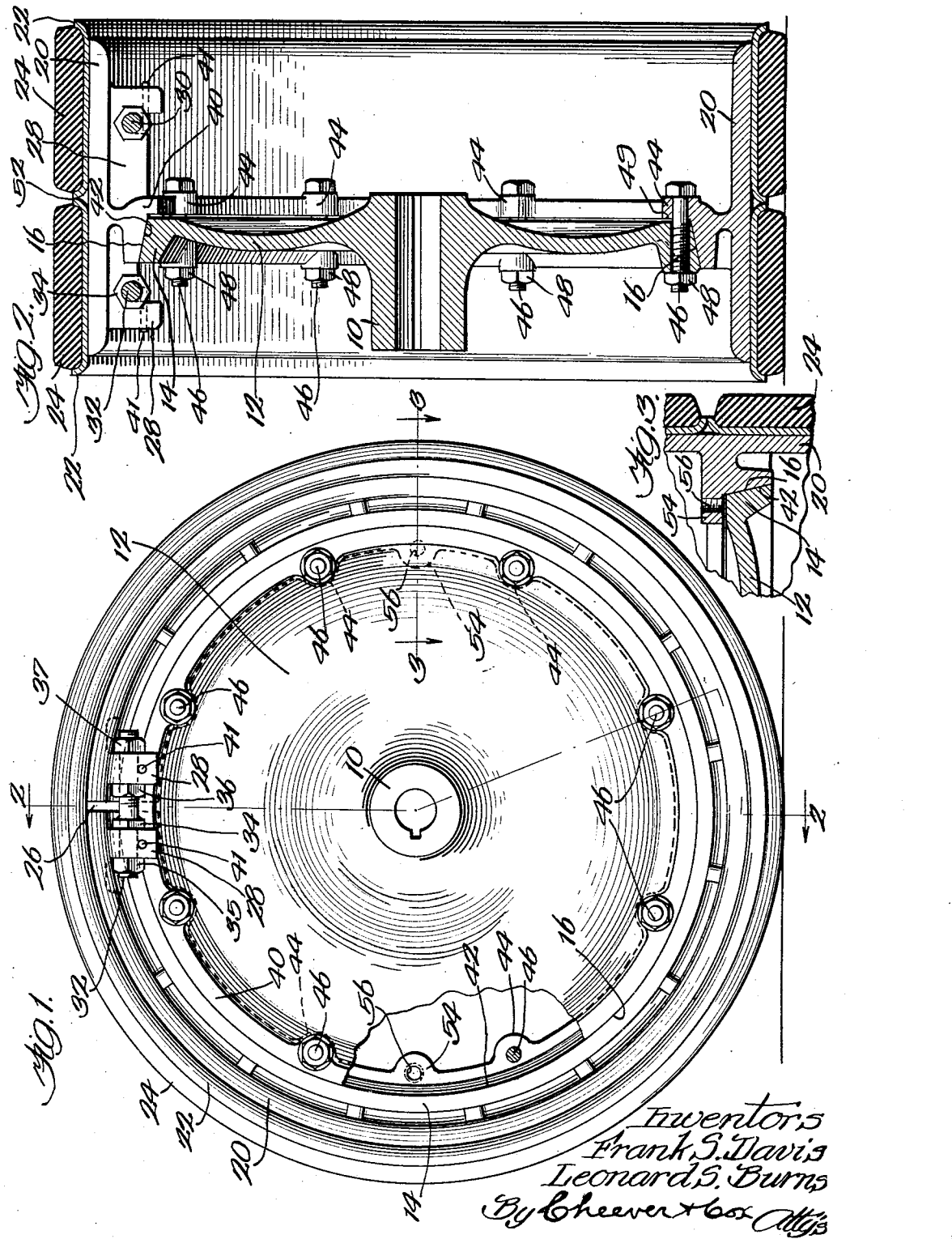
Inventors
Frank S. Davis
Leonard S. Burns
By Cheever & Cox Attys Patented Dec. 10, 1929

1,739,127

UNITED STATES PATENT OFFICE

FRANK S. DAVIS, OF HOMEWOOD, AND LEONARD S. BURNS, OF HARVEY, ILLINOIS, ASSIGNORS TO AUSTIN MANUFACTURING CO., OF CHICAGO, ILLINOIS, A CORPORATION OF ILLINOIS

DUAL-TIRE WHEEL

Application filed October 16, 1926. Serial No. 141,934.

This invention relates to heavy vehicle wheels for use on coaches, trucks, tractors, road machines, etc., of the double, parallel or dual tire type.

It is the common practice in this art to provide a wheel of suitable strength on whose periphery the two tires, usually solid rubber or cushion tires, are pressed side by side, and from which the tires proper have to be removed by corresponding pressure across the rim of the wheel. In order to make the tires stay in place in service, it is necessary that they closely fit the felly of the wheel with the result that extremely heavy and not always available machinery is required for the pressing operations required in applying and removing the tires from the wheel, this being particularly true where the wheel is used in rural districts far remote from public garages and the like, equipped with such machinery.

The object of this invention is to provide a wheel construction to which dual tires may be easily applied and removed without the aid of any extraneous machinery, this regardless of the size of the wheel and the weight of the wheel or tires to be applied thereto. Broadly stated, the invention consists in providing the wheel proper with a detachable, expansible and contractible metallic felly member on which the dual tires are mounted, said felly member being controlledly expansible not only at its center but at its peripheral edges to insure accurate adjustment of each of the tires on the wheel.

The invention further consists in novel mechanical means for separating the tires from the wheel rim when demounting of tires is required.

The invention further consists in numerous features and details of construction which will be hereafter more fully set forth in the specification and claims.

Referring to the drawings in which like numerals designate the same parts throughout the several views:

Figure 1 is a side elevation, showing a wheel of this invention with tires applied thereto, ready for use.

Figure 2 is a detailed, sectional view on the irregular line 2—2 of Figure 1.

Figure 3 is a detailed, sectional plan view on the line 3—3 of Figure 1.

In carrying out this invention, a central wheel, usually of cast steel or iron, is provided, including a central hub 10, a radial flange 12 and a flange 14 having an inclined circumferential surface 16 of substantially less diameter than the internal diameter of the tires to be carried. Outside of but embracing this main wheel is an expansible tire carrying felly member 20 adapted to receive conventional metallic parallel tire holders or rims 22, each supporting a central cushion or other tire 24. This felly member 20 is split at 26, there being a sufficient clearance between the adjacent ends of this member at this split so that the felly member can be contracted sufficiently to permit its removal from inside the tire holders or rims 22. The ends of the felly member 20, adjacent to the point of severance 26, heretofore referred to, are provided with parallel, inwardly projecting, transversely extending lugs 28. The opposite ends of these two lugs 28 are connected together by stud bolts 30 and 32, each provided with a fixed head 34 and a suitable complement of nuts 35, 36 and 37 so that by proper manipulation in conventional manner, the opposite lugs 28 and consequently the opposite ends of the felly member can be drawn together or forced apart as may be required in the operation of installing, adjusting or removing the dual tires 24 as hereafter described.

The tire carrying felly member just described is provided with an inwardly projecting radial ring flange 40 having on one side an angular, annular recess 42 within which the flange 14 of the central main wheel fits, one face of said angular recess corresponding in angularity to the inclined face 16 of main wheel flange 14 heretofore referred to. This inwardly turned flange 40 is also provided with a multiplicity of circumferentially disposed bolt receiving lugs 44, each adapted to receive a bolt 46 passing through the flange 40 and the main wheel, as clearly shown in the drawings. Each bolt 46 is provided with a conventional, detachable nut 48 which may be manipulated by an operator either in the shop or in the field to tighten the bolt and thus force the main wheel and the wheel carrying flange 40 into frictional contact along the inclined or wedged surfaces 16 heretofore described. Pressure exerted on all the bolts 46 causes the wheel carrying felly member 20 to expand at line of severance 26, the stud bolts 32 having been previously loosened to permit such expansion.

The parts are so proportioned that in all positions of placement of the main wheel inside the tire carrying felly member, there will be a clearance space 49 left between members 14 and 40, thereby permitting the maximum required movement of the main wheel inside the tire carrying felly member 20 along surface 16.

When the parts have been loosely assembled in the general position of Figures 1 and 2, with the bolts 32 and 30 loosened and the operator has tightened bolts 46 to properly expand tire carrying felly member 20, and exert a proper pressure on the central circumferential line 52 of the rim, said operator then adjusts bolts 30 and 32 particularly through the agency of nuts 36 to exert proper expanding pressure between the lugs 28 to give the outer circumferential side edges of the felly member 20 proper expanding pressure to hold the outer edges of the dual tires 24 on the felly member 20.

When it is desired to remove tires 24 from the device, the operator first loosens the bolts 46 as much as may be required, even going to the extent of totally removing them from the other parts of the device, and then, with a hammer or other suitable tool moves main wheel 10—14 to the left as viewed in Figure 2, thus releasing the pressure of the wheel on wedge surface 16, adjacent to the felly member 20. The operator now releases nuts 36, properly manipulates nuts 35 and 37 to exert pressure on the lugs 28 to force them together and consequently force the ends of the felly member 20 together at split 26 thus contracting the felly member inside the tire supporting members 22 to such a point that the tires and said supporting members will drop off from the felly member.

As an alternative to the common method of driving the wheel 10—14 out of engagement with wedge surface 16, as heretofore described, the internal projecting flange 40 of tire carrying felly member 20 is preferably provided with a multiplicity of additional bolt carrying lugs 54 provided with internal screw threads 56 interfittable with any one of the bolts 46 heretofore referred to, whereby the operator can take one of said bolts 46, thread it onto one of these lugs 54 and thus exert pressure on the side of main wheel flange 14, as clearly shown in Fig. 3 to thereby powerfully force it to the left as viewed in Fig. 2 and downward as viewed in Fig. 3 out of engagement with inclined wedge surface 16.

By the use of the invention described, an operator can, wherever he is located, manipulate the bolts 46, 30 and 32, as described, to readily remove any tire members 24 from the felly member 20 and to, when the same or other tire members are placed on the felly member, expand the felly member 20 to properly support and lock the tire members in place on the wheel. The only outside tool required by the operator is an ordinary wrench, all special machinery of every kind being dispensed with.

The bolts 30 and 32 are kept from falling out of the notches in lugs 28 in which they are located by cotter pins 41.

Having thus described our invention, what we claim as new and desire to secure by Letters Patent is:

1. In a wheel of the character described, a wheel body having a wedge-shaped periphery, an expansible tire engaging felly having an internal flange provided with a wedge-shaped portion complemental to and engaging the wedge-shaped periphery of said wheel body, means for laterally adjusting said wheel body and said felly with respect to each other so as to vary the expanding tension upon said felly, and means carried by said felly for locking it in expanded relation.

2. In a wheel of the character described, an expansible tire carrying felly, a wheel body inside and independent of the felly, said wheel body and said felly engaging each other along an annular wedge-surface, means for forcing the wheel body laterally into an engagement with the felly along said wedge surface to expand the felly, and means carried by the felly for expanding and contracting it independently of said lateral adjusting means, said independent expanding and contracting means including means for locking the felly in expanded relation.

3. In a wheel of the character described, a wheel body having a wedge-shaped periphery, an expansible tire carrying felly having an inwardly extended radially disposed ring flange provided with a laterally disposed annular wedge-shaped portion complemental to and engaging the wedge shaped periphery of the wheel body, means for adjusting the wheel body and felly along said wedge surfaces so as to vary the expanding tension upon said felly, and means carried by said felly for locking it in expanded relation.

4. In a wheel of the character described, a wheel body consisting of a hub and a radial flange having a laterally extended wedge-shaped peripheral portion, an expansible tire carrying felly having an internal wedge-shaped flange complemental to and engaging the wedge shaped periphery of said wheel body, means for adjusting said wheel body and said felly laterally with respect to each other so as to vary the expanding tension upon said felly, and means carried by the felly for locking it in expanded relation.

5. In a wheel of the character described, a wheel body provided with a hub and a radial flange, said flange being provided with a laterally extended wedge shaped peripheral portion, an expansible tire engaging felly having an inwardly and radially disposed ring flange provided with a laterally disposed annular wedge shaped portion complemental to and engaging the wedge shaped periphery of the wheel body, means for adjusting said wheel body and felly with respect to each other so as to vary the expanding tension upon said felly, and means carried by said felly for locking it in expanded relation.

6. In a wheel of the character described, a wheel body having a wedge shaped periphery provided with spaced apart laterally disposed openings, an expansible tire engaging felly having an internal flange provided with a wedge shaped portion complemental to and engaging the wedge shaped periphery of said wheel body, said internal flange also having laterally disposed spaced apart openings positioned to be aligned with the first mentioned openings, bolts passed through the aligned openings, nuts engaging said bolts so that the wheel body and felly may be adjusted laterally with respect to each other to vary the expanding tension upon the felly, and means carried by the felly for locking it in expanded relation.

In witness whereof, we have hereunto subscribed our names.

FRANK S. DAVIS.
LEONARD S. BURNS.